(12) United States Patent  (10) Patent No.: US 8,746,829 B2
Asai  (45) Date of Patent: Jun. 10, 2014

(54) IMAGE RECORDING APPARATUS AND IMAGE RECORDING METHOD

(75) Inventor: Hiroshi Asai, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 174 days.

(21) Appl. No.: 13/314,731

(22) Filed: Dec. 8, 2011

(65) Prior Publication Data

US 2012/0206526 A1 Aug. 16, 2012

(30) Foreign Application Priority Data

Feb. 10, 2011 (JP) ................. P2011-27333

(51) Int. Cl.
*B41J 2/205* (2006.01)
(52) U.S. Cl.
USPC .............................. 347/15; 347/40
(58) Field of Classification Search
USPC ................. 347/9, 15, 40–43, 131
See application file for complete search history.

(56) References Cited

U.S. PATENT DOCUMENTS

| | | | |
|---|---|---|---|
| 5,949,453 A | 9/1999 | Harris et al. | |
| 6,226,104 B1* | 5/2001 | Shiomi et al. | 358/1.9 |
| 2004/0041868 A1 | 3/2004 | Maru et al. | |
| 2004/0090489 A1* | 5/2004 | Hayashi | 347/41 |
| 2005/0264834 A1 | 12/2005 | Asai et al. | |
| 2006/0066671 A1* | 3/2006 | Kato et al. | 347/43 |
| 2008/0174860 A1* | 7/2008 | Yelleswarapu et al. | 359/370 |
| 2010/0118076 A1 | 5/2010 | Kondo | |
| 2010/0134546 A1* | 6/2010 | Murai | 347/14 |
| 2010/0141973 A1* | 6/2010 | Barth | 358/1.9 |

FOREIGN PATENT DOCUMENTS

| | | |
|---|---|---|
| EP | 1601182 A2 | 11/2005 |
| JP | 7-186411 | 7/1995 |
| JP | 2006-14271 | 1/2006 |
| WO | WO-2007/114527 A1 | 10/2007 |

OTHER PUBLICATIONS

Extended European Search Report issued in European Patent Application No. 11193616.7 dated Oct. 8, 2012.

* cited by examiner

*Primary Examiner* — Manish S Shah
*Assistant Examiner* — Yaovi Ameh
(74) *Attorney, Agent, or Firm* — McDermott Will & Emery LLP

(57) ABSTRACT

An image recording apparatus has low intensity ink ejection parts for ejecting low intensity ink, and a high intensity ink ejection part for ejecting high intensity ink. With respect to a direction orthogonal to a moving direction of printing paper, a pitch of outlets in the high intensity ink ejection part is larger than that in the low intensity ink ejection part. Thus, manufacturing cost of the apparatus is reduced. With respect to each gray level in a middle grayscale range, if a tint image is recorded with the high intensity ink, a spatial frequency of this tint image is lower than that of a tint image recorded with the low intensity ink. By the above image recording control, even if the high intensity ink ejection part includes an abnormal outlet where a flight direction of droplet is abnormal, streak unevenness in a color halftone image can be suppressed.

18 Claims, 11 Drawing Sheets

511

512

513

514

515

516

521

522

523

524

525

526

532

533

IMAGE RECORDING APPARATUS AND IMAGE RECORDING METHOD

TECHNICAL FIELD

The present invention relates to a technique of recording a halftone image on an object.

BACKGROUND ART

When a grayscale original image (i.e., a continuous-tone image) is recorded on various objects, used is FM (Frequency Modulated) screening where grayscale representation is achieved by changing the number of equal size dots irregularly disposed (each of which is a minimum recordable unit of dot formation, and it is also called as a microdot). Especially in an image recording apparatus such as a printer using an inkjet mechanism whose dot recording resolution is comparatively low, FM screening is frequently used. However, if a flight direction of ink droplet from one outlet is varied, streak unevenness (line mura) often appears in FM screening.

In an image recording system, disclosed in Japanese Patent Application Laid-Open No. 2006-14271 (Document 1), for recording an image on a printing plate, dot centers are arranged uniformly and randomly in a matrix area which is to store a threshold matrix. For each color component, a halftone cell which serves as a unit for generation of a halftone dot is set around each dot center. Threshold values are set in the threshold matrix so that dot-like halftone dot areas grow from the plurality of dot centers in accordance with the shape of the halftone cells with increase in gray level of an original image. In recording a halftone image on the printing plate, gray values for one color component of respective pixels in the original image and the corresponding threshold values in the threshold matrix are inputted to a comparator to generate signal of halftone image and the halftone image is recorded on the printing plate by a head. In the image recording system, since the density of the dot centers arranged randomly is changed color by color, graininess in the printed image can be reduced.

A multi-pen printer disclosed in Japanese Patent Application Laid-Open No. 7-186411 (Document 2) has color pens and a black pen. In the color pens, a resolution is 300 dpi and a print width is ⅓ inch. In the black pen, a resolution is 600 dpi and a print width is ½ inch. Since the high performance black pen is used, frequent text and graphics represented by only black can be printed with high speed and high quality. Also in printing color graphics or the like, a large portion of color graphics content is represented with the black component and the black component is printed at a higher resolution. Thus, quality of whole color graphics is improved. Throughput of printing color graphics can be also improved.

As described above, in an image recording apparatus using an inkjet mechanism, there may be a case where a flight direction of ink is skewed due to fabrication error of an outlet for ejecting ink or the like, and dots are formed at positions misaligned from the intended dot formation positions on an object. And when the misaligned dots are continuous in a scan direction of the outlets, streak unevenness appears in the image. Also in the case where there is an outlet whose ink ejection amount is lower, dots smaller than the surrounding dots are continuous in the scan direction and therefore streak unevenness appears.

There is a technique, for prevention of such streak unevenness, where the number of outlets per unit length in a width direction parallel to a recording surface of the object and orthogonal to the scan direction is made large. However, increase of outlets causes increase of manufacturing cost of the image recording apparatus. In other words, both suppression of manufacturing cost of the apparatus and suppression of streak unevenness could not be achieved at the same time.

SUMMARY OF INVENTION

The present invention is intended for an image recording apparatus using an inkjet mechanism, for recording a halftone image on an object. It is an object of the present invention to suppress streak unevenness while reducing manufacturing cost.

The image recording apparatus according to the present invention comprises: a first ejection part having a plurality of first outlets for ejecting droplets of low intensity ink toward an object; a second ejection part having a plurality of second outlets for ejecting droplets of high intensity ink toward the object; a moving mechanism for moving the object relative to the first ejection part and the second ejection part; and a controller for controlling ejection of ink from the first ejection part and the second ejection part in synchronization with relative movement of the object; wherein with respect to a direction which is orthogonal to a moving direction of the object by the moving mechanism and which is parallel with a recording surface of the object, a pitch of the plurality of second outlets is larger than a pitch of the plurality of first outlets, under control of the controller, with respect to each gray level included in a predetermined middle grayscale range of image density, if a tint image is recorded with the high intensity ink, a spatial frequency of the tint image is lower than a spatial frequency of a tint image recorded with the low intensity ink, and with respect to each gray level which is lower than at least the middle grayscale range, dots each of which is a minimum unit of dot formation with the low intensity ink are randomly disposed on the object while being away from one another and grayscale representation is made with a number density of the dots.

In the present invention, it is possible to suppress streak unevenness while reducing manufacturing cost.

According to an aspect of the present invention, the high intensity ink is yellow ink.

According to another aspect of the present invention, the high intensity ink is light cyan ink or light magenta ink.

Preferably, a halftone image is recorded on the object by one movement of the first ejection part and the second ejection part relative to the object by the moving mechanism.

According to a preferred embodiment of the present invention, the controller comprises: a memory which stores threshold matrices each of which is a two dimensional array of a plurality of threshold values; and a halftone image generator for generating data of a halftone image to be recorded, by comparing original image data with the threshold matrices.

In this case, more preferably, under control of the controller, with respect to each gray level included in a range from zero to a transition value lower than the middle grayscale range, dots each of which is a minimum unit of dot formation with the high intensity ink are randomly disposed on the object while being away from one another and grayscale representation is made with a number density of the dots, and with respect to gray levels which are higher than the transition value, a number density of centers of dots with the high intensity ink is constant and grayscale representation is made with sizes of the dots.

The present invention is also intended for an image recording method using an inkjet mechanism, of recording a halftone image on an object.

These and other objects, features, aspects and advantages of the present invention will become more apparent from the following detailed description of the present invention when taken in conjunction with the accompanying drawings.

DESCRIPTION OF EMBODIMENTS

Figure 1:
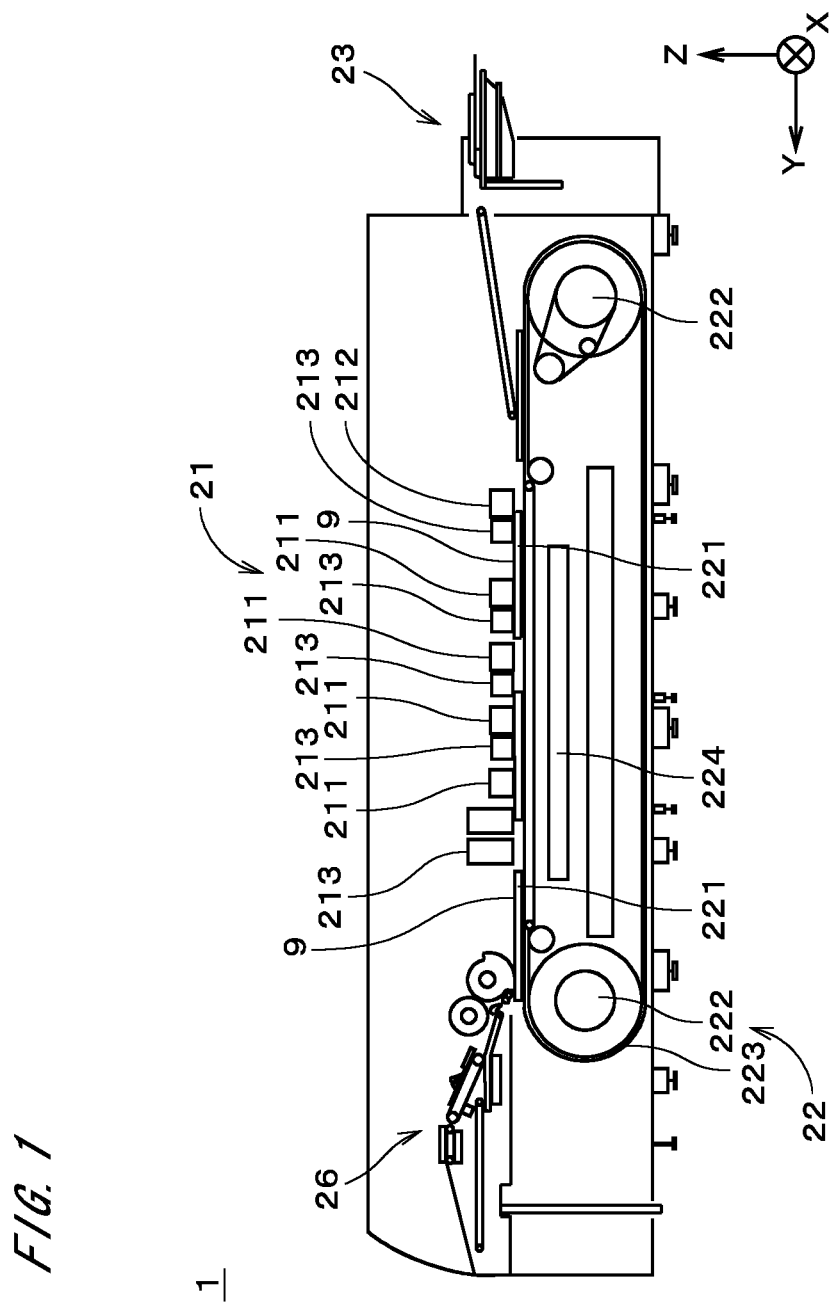
FIG. 1 is a view showing an image recording apparatus in accordance with a preferred embodiment.

FIG. 1 is a view showing a constitution of an image recording apparatus 1 using an inkjet mechanism in accordance with a preferred embodiment of the present invention. The image recording apparatus 1 is a color printer for recording a color halftone image on a printing paper 9 which is an object. The image recording apparatus 1 is a sheet-fed printing apparatus for sequentially recording images on a plurality of printing papers 9.

The image recording apparatus 1 has a head 21 for ejecting fine droplets of ink toward a printing paper 9 from a plurality of outlets, a moving mechanism 22 for moving the printing paper 9 relative to the head 21 in the (+Y) direction in FIG. 1, a feeder 23 for holding the plurality of printing papers 9 and sequentially feeding the plurality of printing papers 9 to the moving mechanism 22, a collecting part 26 for collecting the printing paper 9 on which an image is recorded, and a controller for controlling these constituents. In the image recording apparatus 1, ejection of ink from the head 21 is controlled by the controller in synchronization with relative movement of the printing paper 9 toward the (+Y) direction, and therefore an image is recorded on the printing paper 9. The X direction, Y direction and Z direction in FIG. 1 are orthogonal to one another, and the Z direction corresponds to the up-down direction. Hereinafter the (+Y) direction is referred to as a "moving direction".

The moving mechanism 22 has two belt rollers 222 arranged along the moving direction of the printing paper 9 and connected to a not-shown motor, a belt 223 hanging between the two belt rollers 222, a plurality of tables 221 attached on the belt 223, and a linear motor mechanism 224. In the moving mechanism 22, the belt rollers 222 rotate counterclockwise to move the tables 221 along an orbit of the belt at a high speed. In image recording, one table 221 holding one printing paper 9 is detached from the belt 223, and the table 221 is moved accurately in the moving direction by the linear motor mechanism 224. After image recording is completed, the table 221 is attached on the belt 223 again.

The head 21 has a pretreatment part 212, four ejection parts 211 for ejecting black ink, cyan ink, magenta ink and yellow ink, respectively, and five heaters 213 located on the (+Y) sides of the one pretreatment part 212 and the four ejection parts 211. The pretreatment part 212, the four ejection parts 211 and the five heaters 213 are arranged in the moving direction. The pretreatment part 212 applies transparent pretreatment agent onto the printing paper 9 before image recording. The heaters 213 blow hot air to the printing paper 9 to dry ink adhering on the printing paper 9.

Figure 2:
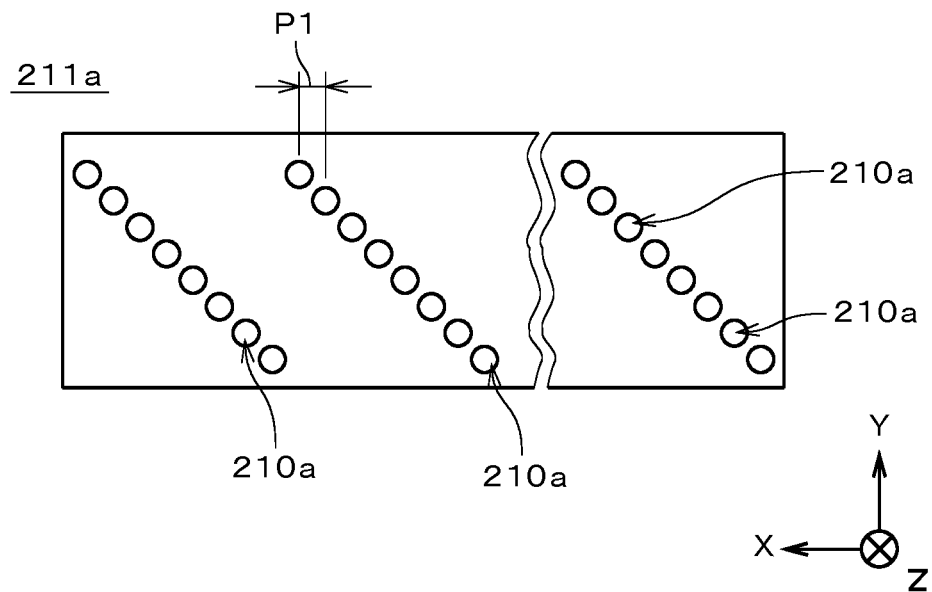
FIG. 2 is a bottom plan view showing a low intensity ink ejection part.

FIG. 2 is a bottom plan view showing an ejection part for ejecting any one of cyan ink, magenta ink or black ink. In the following description, out of black ink, cyan ink, magenta ink and yellow ink, yellow ink which shows highest intensity is referred to as "high intensity ink" and the other ink (i.e., black ink, cyan ink and magenta ink) is referred as "low intensity ink". Also each ejection part for ejecting the low intensity ink is referred to as a "low intensity ink ejection part 211a". Here, the intensity means a luminous intensity (luminance) of each ink on the printing paper 9, and the intensity of each ink is generally represented as $\int \rho(\lambda) d\lambda$ where $\lambda$ is wavelength of light and $\rho(\lambda)$ is a distribution of spectral reflection factor. The intensity can be measured with a commercially available color luminance meter.

On a bottom surface of each low intensity ink ejection part 211a, a plurality of outlets (ejection outlets) 210a each for ejecting droplets of the low intensity ink toward the printing paper 9 (i.e., toward the (−Z) direction in FIG. 1) are provided. In the plurality of outlets 210a, several outlets consisting of each group are arranged diagonally right down in FIG. 2. In FIG. 2, arrangement of the outlets 210a is shown simplistically. An actual ejection part is an assembly of a number of ejection units, many outlets 210a may be arranged in various patterns. On the whole of the plurality of outlets 210a, the outlets 210a are arranged in the X direction which is a direction orthogonal to the moving direction of the printing paper 9 and parallel to a recording surface of the printing paper 9. Hereinafter, the X direction is referred to as an "arrangement direction". In the low intensity ink ejection part 211a, ejection of droplet from each outlet 210a is achieved by a piezoelectric element, however an ejection part which can eject droplets by another technique may be employed. The same applies to an ejection part shown in FIG. 3.

Figure 3:
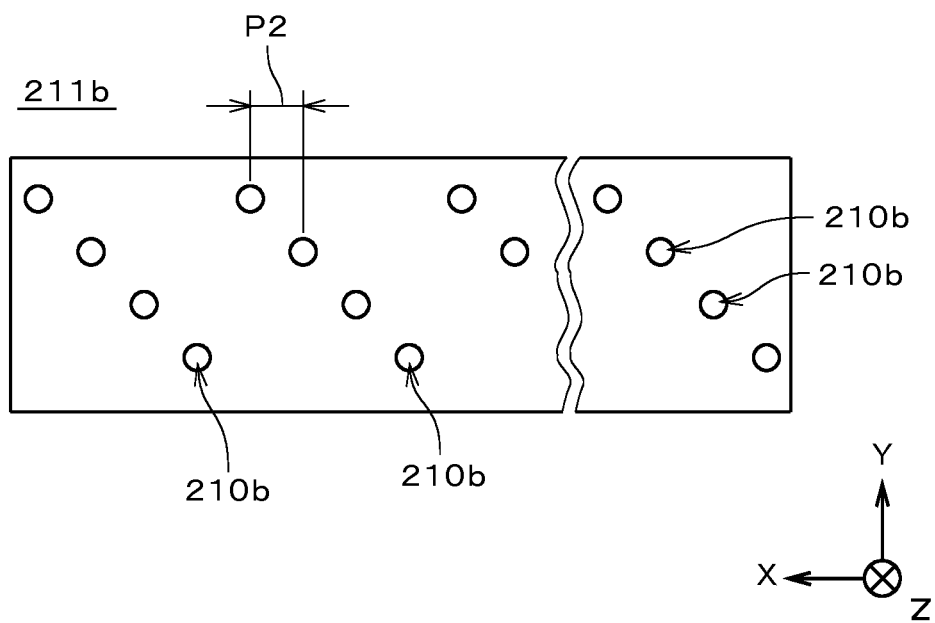
FIG. 3 is a bottom plan view showing a high intensity ink ejection part.

FIG. 3 is a bottom plan view showing an ejection part for ejecting the high intensity ink (hereinafter the ejection part is referred to as a "high intensity ink ejection part 211b".). On a bottom surface of the high intensity ink ejection part 211b, a plurality of outlets 210b each for ejecting droplets of the high intensity ink toward the printing paper 9 are provided. The plurality of outlets 210b are shown simplistically so that several outlets consisting of each group are arranged diagonally right down in FIG. 3, in a similar fashion to the low intensity ink ejection part 211a. On the whole of the plurality of outlets 210b, the outlets 210b are arranged in the arrangement direction which is the X direction. With respect to the arrangement direction, a pitch P2 of the outlets 210b of the high intensity ink ejection part 211b is larger than a pitch P1 of the outlets 210a of the low intensity ink ejection part 211a. In other words, the number of outlets 210b per unit length in the arrangement direction is smaller than the number of outlets 210a per unit length. In the present embodiment, the pitch P2 is equal to twice the pitch P1.

Each of the pretreatment part 212, the low intensity ink ejection part 211a and the high intensity ink ejection part 211b is provided across an entire printing area on the printing paper 9 with respect to the arrangement direction (in this example, the entire width of the printing paper 9 in its width direction), and halftone image recording on the printing paper 9 can be accomplished by one movement of the printing paper 9 relative to the head 21 by the moving mechanism 22 (i.e., by one time passage of the printing paper 9, moving in the moving direction, under the head 21) (that is, so-called one pass printing can be performed.).

Figure 4:
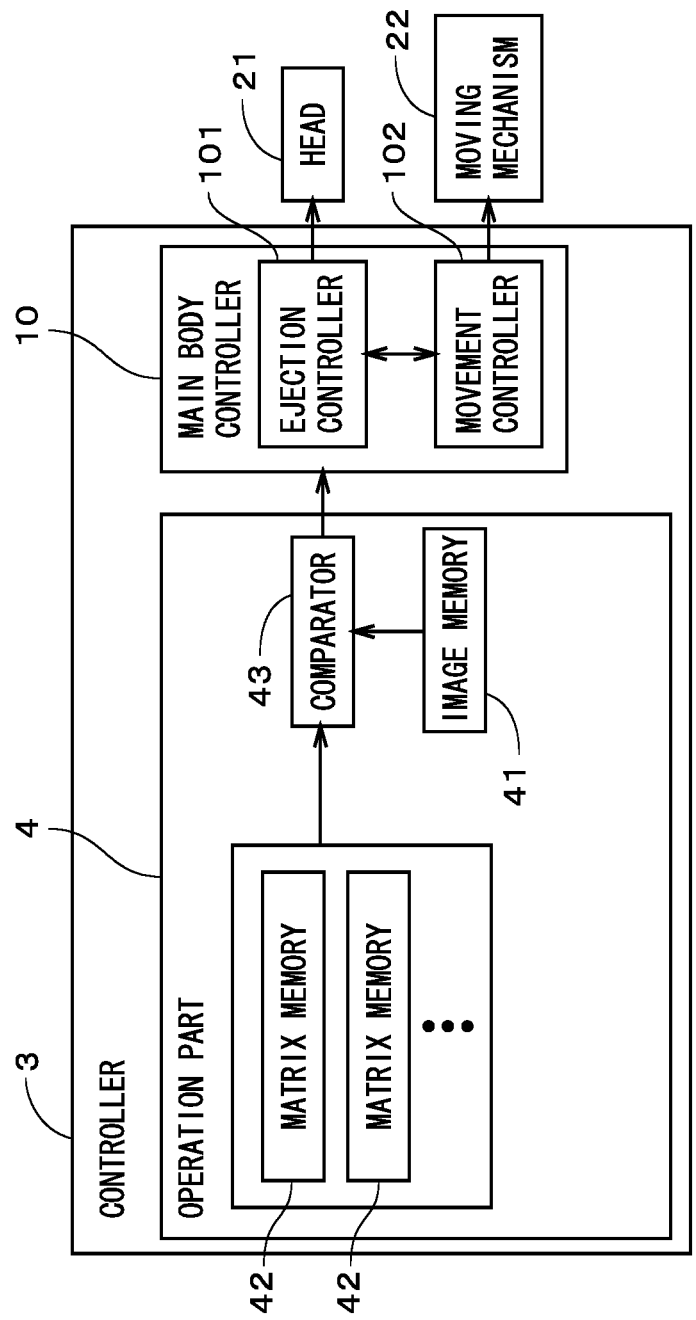
FIG. 4 is a view showing a functional constitution of the image recording apparatus.

FIG. 4 is a block diagram showing a functional constitution of the image recording apparatus 1. The controller 3 has an operation part 4 for performing various computations, and a main body controller 10 for controlling respective constituents such as the head 21 and the moving mechanism 22. The operation part 4 has an image memory 41 for storing color image data which is inputted from an external apparatus (i.e., the color image data is image data where each pixel has gray values for a plurality of color components, and hereinafter referred to as "original image data".), a plurality of matrix memories 42 storing threshold matrices for the plurality of color components, respectively, and a comparator 43 (halftoning circuit) which is a comparing part for comparing the original image data with the threshold matrices for respective color components. Each threshold matrix is constituted as a two dimensional array of a plurality of threshold values. The matrix memory 42 is also called as a SPM (Screen Pattern Memory). The comparing part for comparing the original image data with the threshold matrices may be implemented by software. The main body controller 10 has a movement controller 102 for controlling relative movement of the printing paper 9 to the head 21 by the moving mechanism 22, and an ejection controller 101 for controlling ejection of ink from the plurality of outlets in the head 21 in synchronization with the relative movement of the printing paper 9.

Next, discussion will be made on detailed operation of image recording by the image recording apparatus 1 with reference to FIG. 5. In the image recording apparatus 1, color original image data is inputted from an external computer to the image memory 41 of the operation part 4 and stored therein.

Figure 6:
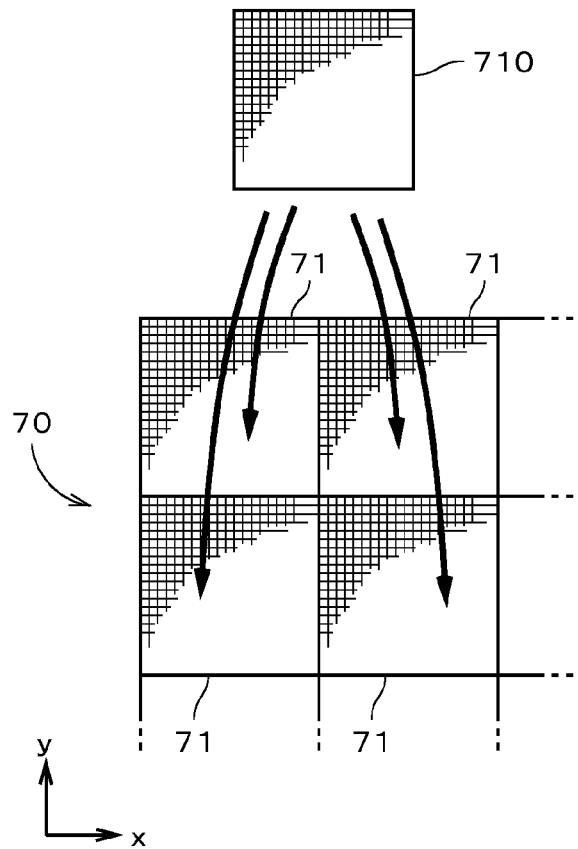
FIG. 6 is a view showing original image data and a threshold matrix.

FIG. 6 is a view conceptually showing the original image data 70 and one threshold matrix 710. In each of the original image data 70 and the threshold matrix 710, a plurality of pixels or a plurality of elements are arranged in a row direction corresponding to the X direction (the row direction is shown as the x direction in FIG. 6.) and a column direction orthogonal to the row direction (the column direction is shown as the y direction in FIG. 6.). In the following description, the original image data is represented by a grayscale range from 0 to 255.

After the original image data 70 is stored in the image memory 41, halftone image data is generated by comparing the original image data 70 with the threshold matrix 710 for each color component in the comparator 43 (step S11). In the image recording apparatus 1, a grayscale image indicated by the original image data (the image is hereinafter referred to as an "original image".) is represented as a halftone image by the halftone image data. As above, the comparator 43 functions as a halftone image generator for generating halftone image data.

In halftoning (halftone screening) of the original image data 70 in step S11, as shown in FIG. 6, the whole area shown in the original image data 70 is divided into a large number of areas having a fixed size and repeat areas 71 each of which serves as a unit in halftoning are set. Each matrix memory 42 has a memory area corresponding to one repeat area 71 and a threshold value is set to each address (coordinates) of this memory area to store the threshold matrix 710. Conceptually, each repeat area 71 of the original image data 70 and the threshold matrix 710 for each color component are superposed and a gray value (pixel value) for the color component of each pixel in the repeat area 71 is compared with a threshold value in the threshold matrix 710 corresponding to the gray value, to thereby determine whether recording (formation of a dot of the color) should be performed at the position of the pixel on the printing paper 9.

Actually, with respect to each color component, a gray value of one pixel in the original image data 70 is read out from the image memory 41 on the basis of an address signal outputted from an address generator of the comparator 43 in FIG. 4. An address signal representing a position in the repeat area 71 corresponding to the pixel in the original image data 70 is also generated in the address generator, one threshold value in threshold matrix 710 for the color component is specified and read out from the matrix memory 42. With respect to each color component, the gray value from the image memory 41 and the threshold value from the matrix memory 42 are compared by the comparator 43, to determine a value of the position (address) of the pixel in binary output image data for each color component. Thus, looking at one color component, in the grayscale original image data 70 shown in FIG. 6, for example, a value "1" is assigned (i.e., a dot is set) at each position where a gray value is larger than a threshold value of the threshold matrix 710 corresponding to the gray value, and a value "0" is assigned (i.e., a dot is not set) at each of remaining pixels, to generate the binary output image data as the halftone image data of the above color component.

Figure 5:
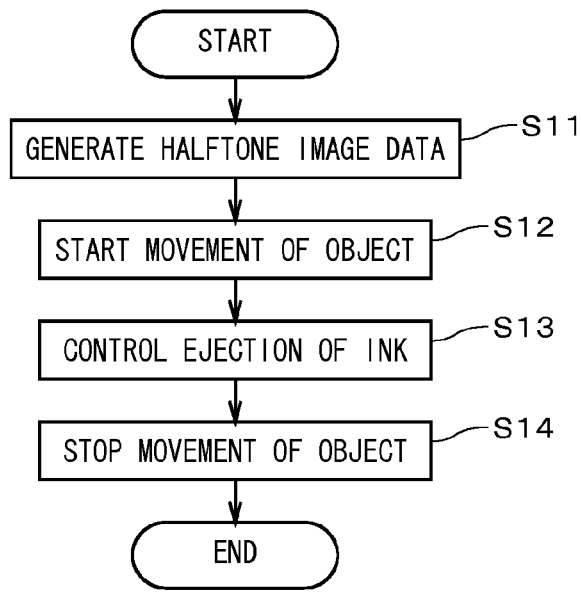
FIG. 5 is a flowchart showing an operation flow for recording a halftone image.

After (a portion of) halftone image data for a portion to be firstly recorded in the original image data 70 (for example, the portion is a plurality of repeat areas 71 at the end on the (+y) side) is generated for each color, the movement controller 102 drives the moving mechanism 22 and therefore relative movement of the printing paper 9 to the head 21 is started (FIG. 5: step S12). By the ejection controller 101, in accordance with halftone image data, the low intensity ink is ejected from the outlets 210a in each of the three low intensity ink ejection parts 211a and the high intensity ink is ejected from the outlets 210b in the one high intensity ink ejection part 211b. After halftone image data for a portion to be secondly recorded in the original image data 70 is generated, the low intensity ink and the high intensity ink are further ejected from the outlets 210a, 210b in synchronization with the relative movement of the printing paper 9. As just described, the above halftoning process (generation process of halftone image data) is performed while ejection of the low intensity ink and the high intensity ink from the plurality of outlets 210a, 210b is controlled in parallel with the relative movement of the printing paper 9 (step S13).

Ink is ejected from the outlets 210a and the outlets 210b on the basis of halftone image data for a portion to be lastly recorded in the original image data 70, and therefore recording of the color halftone image, representing the color original image, on the printing paper 9 is completed. After that, the printing paper 9 is collected to the collecting part 26, and movement operation of the printing paper 9 is stopped (step S14).

Next, discussion will be made on images recorded with cyan ink, magenta ink, black ink and yellow ink. FIGS. 7A to 7F are views showing the tint images 511 to 516 on the printing paper 9 where the tint images are recorded with low intensity ink, and FIGS. 7A to 7F show the images in which the whole areas have uniform image densities of 5% (percent), 10%, 20%, 60%, 80% and 90%, respectively. Here, the image density means a percentage of positions on which ink is ejected, out of all pixel positions, and actually any dot formed on one pixel position is not a square. The same in essence applies to FIGS. 8A to 8F described later.

In the following description, uniform gray values indicating the image density of the tint image (also called as a flat tint image) are referred to as a "gray level", to be distinguished from a gray value which is a value (pixel value) of each pixel in image data. FM (Frequency Modulated) screening is used for grayscale representation of halftone image with the low intensity ink. In other words, equal size dots are randomly disposed on the recording surface of the printing paper 9, and grayscale representation is made by changing a number density of the dots (i.e., by changing a density in the number of the dots). In a highlight side (highlight range) where the image density is low, the dots are disposed away from one another. One dot has a size of a minimum recordable unit of dot formation on the printing paper 9 with the low intensity ink. Hereinafter, a dot having the size of the minimum unit of dot formation is referred to as a "unit dot". In addition, the tint image recorded with the low intensity ink is referred to as a "low intensity tint image".

Next, discussion will be made on generation of the threshold matrix which is used for ejection control of the low intensity ink. In the following description, an element at which one threshold value is assigned in the memory area for the matrix is referred to as a "pixel", in a similar fashion to elements in an image. First, zero or a positive integer value is assigned at one pixel. Subsequently, a next positive integer value in ascending order is assigned to a pixel located at a position farthest from the above one pixel in consideration of repeat of the threshold matrix to the plurality of repeat areas 71. The above operation is repeated to assign integer values to all pixels. Then, the integer values which are assigned to respective pixels are converted to integer values included in a range from 0 to 255 while almost maintaining the order (large and small relation), and converted integer values are treated as threshold values.

Figure 8A:
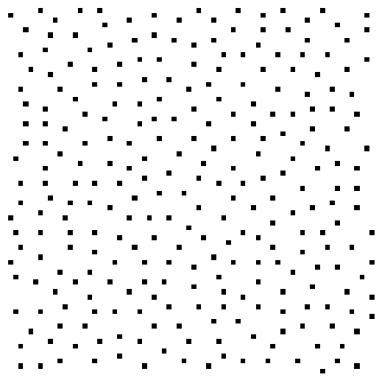
FIGS. 8A to 8F are views showing tint images recorded with high intensity ink.
Figure 8B:
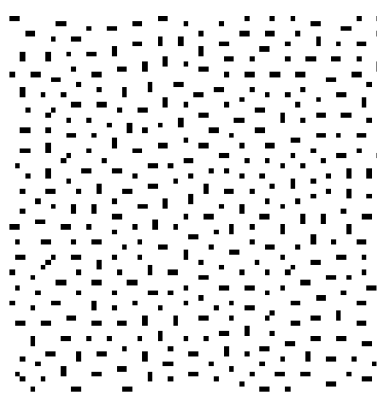
Figure 8C:
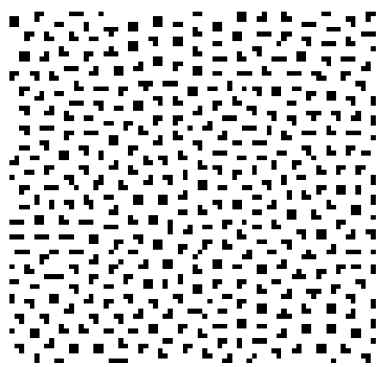

FIGS. 8A to 8F are views showing tint images 521 to 526 on the printing paper 9 where the tint images are recorded with high intensity ink, and FIGS. 8A to 8F show images in the case where all pixels in the original image have uniform densities of 5%, 10%, 20%, 60%, 80% and 90%, respectively. Hereinafter, the tint image recorded with the high intensity ink is referred to as a "high intensity tint image". As shown in FIG. 8A, in a highlight side where the image density is equal to or more than 0% and less than 5%, grayscale representation is made by changing the number of unit dots disposed randomly and almost uniformly. In other words, equal size dots are randomly disposed on the recording surface of the printing paper 9 while being away from one another and grayscale representation is performed by changing a number density of the dots. As shown in FIGS. 8B to 8E, in the case where the image density is equal to or more than 5% and less than 80%, grayscale representation is made by bringing unit dots close (adjacent) to one another to form large dots (hereinafter referred to as "aggregate dots"), that is, grayscale representation is achieved by making the aggregate dots grow.

Figure 8D:
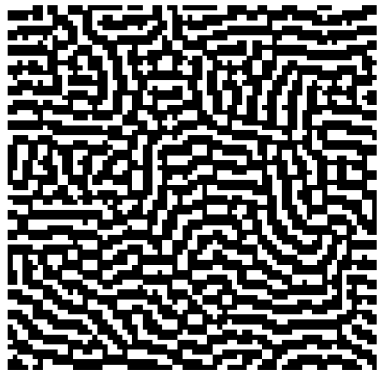
Figure 8E:
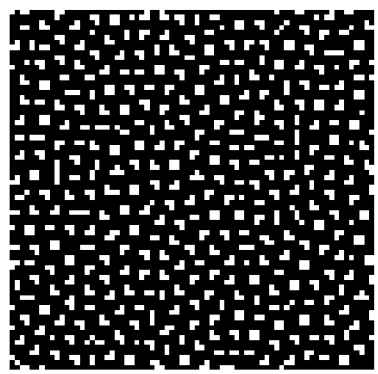
Figure 8F:
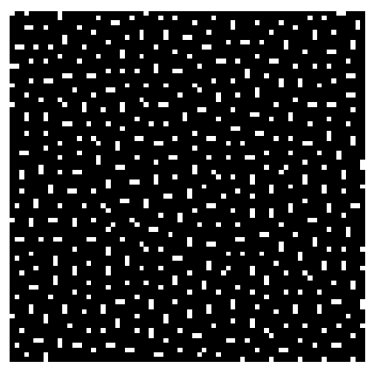

In the case where the image density is 50% as shown in FIG. 8D, almost all aggregate dots are connected to one another. When the aggregate dots further grow as shown in FIGS. 8E and 8F, white dots are scattered among the aggregate dots. As above, although it is difficult to recognize the aggregate dots individually (one by one) in the shadow side (shadow range), grayscale representation is made by making the aggregate dots grow in essence. In the end of the shadow side, white fine dots which represent background color are scattered at positions where the high intensity ink is not drawn, and these fine dots sequentially disappears with increase in image density.

Actually in the high intensity ink ejection part 211b, the number of the outlets 210b per unit length in the arrangement direction is smaller than the number of the outlets 210a per unit length in the low intensity ink ejection part 211a, and therefore unit dots can not be formed at many pixel positions in the shadow side as shown in FIGS. 8E and 8F. Thus, in the shadow side, unit dots larger than unit dots used in the highlight side are used, and therefore a high image density, that is, a high gray level is represented. Such large unit dot is achieved by increasing an ink ejection amount from each outlet.

As above, with respect to each gray level which is included in a range from 0 (zero) to a predetermined transition value (in the present embodiment, a gray level corresponding to 5% in image density) lower than the middle grayscale range, unit dots formed with the high intensity ink are randomly disposed on the printing paper 9 while being away from one another and grayscale representation is made with a number density of the unit dots. With respect to gray levels which are higher than the above transition value, a number density of centers of dots (aggregate dots) with the high intensity ink is constant and grayscale representation is made by changing sizes of aggregate dots which are formed by connection of unit dots. As above, a grayscale representation method is changed (switched) at the transition value.

In generation of the threshold matrix used for ejection control of the high intensity ink, respective halftone cells each of which is a unit for dot generation are set around a plurality of dot center disposed randomly and uniformly in the memory area for the matrix. In each halftone cell, integer values in ascending order are sequentially assigned to pixels in order from nearest to farthest from the dot center, so that a dot grows around the dot center with increase in gray level. Then, the integer values which are assigned to respective pixels are converted to integer values included in a range from 0 to 255 while almost maintaining the order (large and small relation), and converted integer values are treated as threshold values. Therefore, generated is the threshold matrix for the high intensity ink whose spatial frequency characteristic is different from that of the threshold matrix for the low intensity ink, that is, whose spatial frequency is lower than that of the threshold matrix for the low intensity ink in the case where the threshold values are regarded as pixel values.

Figure 7A:
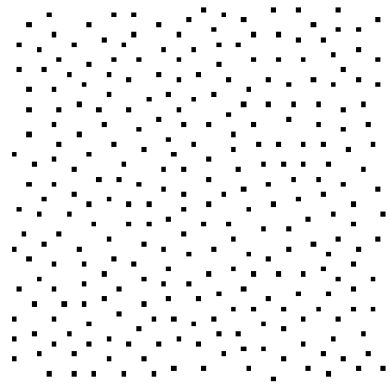
FIGS. 7A to 7F are views showing tint images recorded with low intensity ink.
Figure 7B:
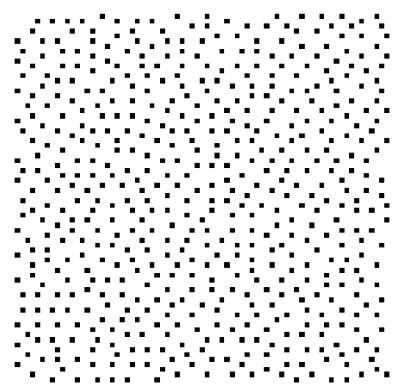
Figure 7C:
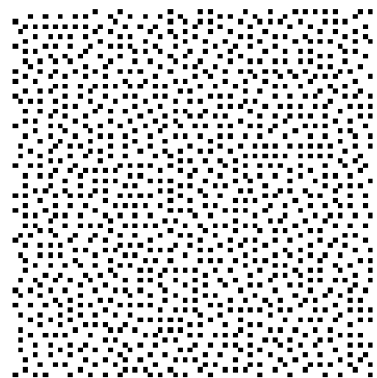
Figure 7D:
Figure 7E:
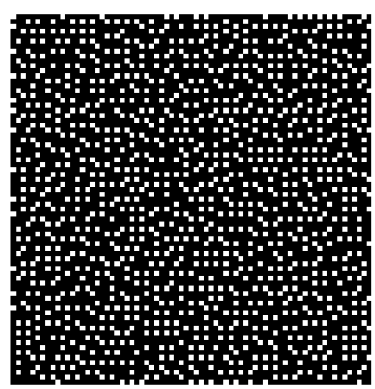
Figure 7F:
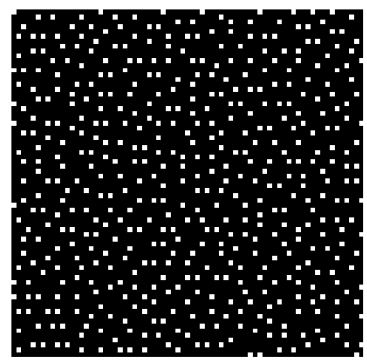

In a grayscale range of highlight side where the image density is equal to or less than 5%, since both the low intensity tint image 511 shown in FIG. 7A and the high intensity tint image 521 shown in FIG. 8A are almost same FM halftone images, spatial frequencies of these images are almost identical to each other. On the other hand, in the middle grayscale range, respective spatial frequencies of the high intensity tint images 522 to 525 shown in FIGS. 8B to 8E are lower than spatial frequencies of the low intensity tint image 512 to 515 shown in FIGS. 7B to 7E having same gray levels as the high intensity tint images 522 to 525. In a grayscale range about the end of the shadow side, since ink is ejected onto almost all positions on the recording surface of the printing paper 9, a spatial frequency of the low intensity tint image 516 shown in FIG. 7F is almost equal to a spatial frequency of the high intensity tint image 526 shown in FIG. 8F, in principle.

In the low intensity ink ejection parts 211a and the high intensity ink ejection part 211b, there may be an outlet 210a, 210b in which a flight direction of ink is skewed relative to the moving direction due to fabrication error or the like. When ink is repeatedly ejected from the above outlet 210a, 210b, dots are formed at positions misaligned (shifted) from the intended dot formation positions on the printing paper 9. Also there may be an outlet 210a, 210b whose ink ejection amount is lower than that of the others. In this case, dots smaller than the surrounding dots are continuous in the moving direction of the printing paper 9. Hereinafter such an outlet is referred to as an "abnormal outlet".

Figure 9:
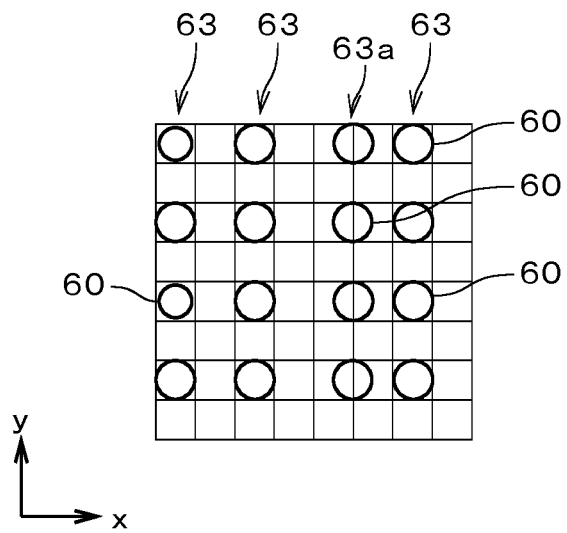
FIG. 9 is a view showing a halftone image.

FIG. 9 is an enlarged view showing a portion of a halftone image in the case where an abnormal outlet exists. In the halftone image 517, grayscale representation is achieved with FM screening, and FIG. 9 shows an example portion where the image density is uniform. A grid in FIG. 9 is drawn to show vertical and horizontal directions, and it is not to show all formation positions of unit dots. The x and y directions corresponds to the X and Y directions in FIG. 1. The same applies to FIGS. 10 and 11. Out of rows (strings) in each of which unit dots 60 are arranged in the y direction (hereinafter the rows are referred to as "dot rows 63".) in the halftone image 517, a second dot row 63a from right toward left is formed at a position slightly misaligned to the right. Hereinafter, the dot row 63a is referred to as a "misaligned dot row 63a".

In the case where the number of outlets per unit length in the arrangement direction (X direction) of the outlets is small, that is, in the case where a pitch of the outlets in the arrangement direction is large, a frequency of ink ejection from one outlet increases compared to an ejection part where the number of outlets per unit length is larger, in same gray level. Therefore, in the halftone image 517, the number of unit dots exactly arranged in a line extending in the y direction increases. Thus, the number of times of ink ejection from the abnormal outlet increases. As a result, compared to the case where the number of outlets per unit length is larger, a gap extending in the y direction arises between the misaligned dot row 63a and another dot row (adjacent dot row) 63, and streak unevenness (line mura) is easily recognized.

In the case where the halftone image 517 is formed with the high intensity ink and any other color ink does not exist on the printing paper 9, it is not easy to recognize streak unevenness when the halftone image 517 is observed. However, when such an image is superimposed (overlaid) with an image formed with ink of another color, a different color is highlighted (brought out in relief) and recognized in the portion where the streak unevenness exists, and the streak unevenness becomes highly-visible.

Figure 10:
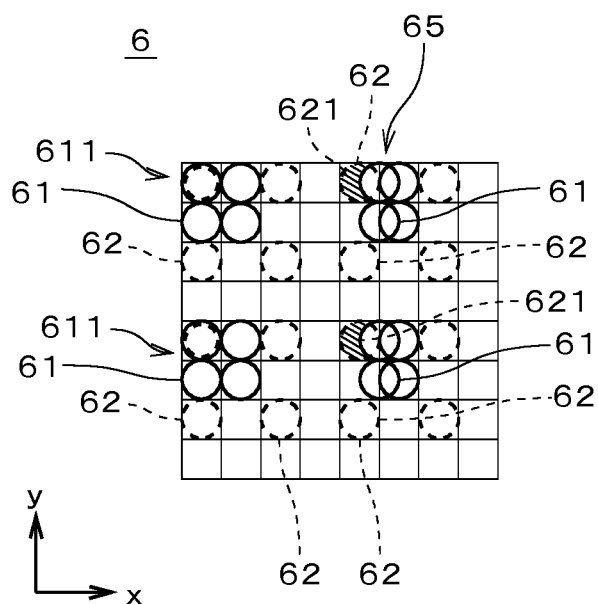
FIGS. 10 and 11 are views showing halftone images recorded with the high intensity ink and the low intensity ink.

FIG. 10 is a view exemplifying a multicolor halftone image 6 recorded by the image recording apparatus 1. The halftone image 6 is an image recorded by superimposing an image with the low intensity ink onto an image with the high intensity ink which has same image density as the image with the low intensity ink, and the halftone image 6 includes a misaligned dot row 65 recorded with the high intensity ink. In FIG. 10, unit dots 61 of the high intensity ink are drawn with solid lines, and unit dots 62 of the low intensity ink are drawn with broken lines. Hereinafter the unit dots 61 are referred to as "high intensity unit dots 61", and the unit dots 62 are referred to as "low intensity unit dots 62". In FIG. 10, an aggregate dot 611 is formed of four high intensity unit dots 61. Actually, as described above, the unit dots 61, 62 are disposed irregularly, and unit dots having different colors are not regularly overlapped with each other. The same applies to FIG. 11 discussed next.

Figure 11:
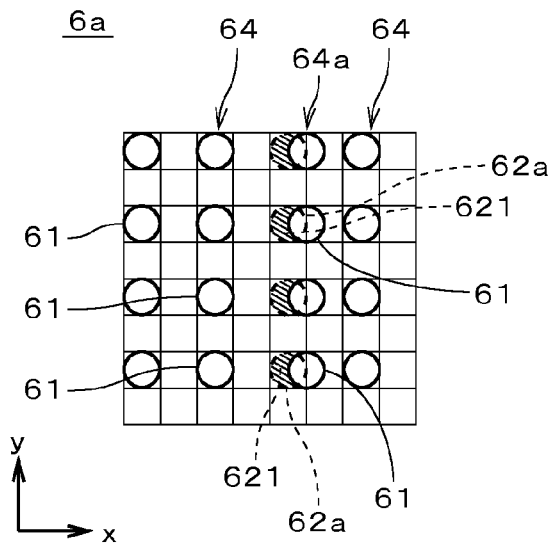

FIG. 11 is a view showing a halftone image 6a in accordance with a comparative example, and the halftone image 6a is recorded by superimposing an image with the low intensity ink onto an image with the high intensity ink which has same image density as the image with the low intensity ink. In the halftone image 6a, grayscale representation with the high intensity ink is achieved with FM screening in the same way as that of the low intensity ink, and a spatial frequency of the high intensity tint image is equal to a spatial frequency of the low intensity tint image.

Out of dot rows 64 in each of which high intensity unit dots 61 are arranged in the y direction, a second dot row from right toward left is a misaligned dot row 64a formed at a position slightly misaligned right from the intended position. In the misaligned dot row 64a, high intensity unit dots 61 partially overlap with low intensity unit dots 62a drawn with broken lines. As shown by hatching in FIG. 11, portions 621 in the low intensity unit dots 62a which do not overlap with the high intensity unit dots 61 (hereinafter the portions are referred to as "non-overlapping portions 621" have a color greatly different from the surrounding colors. For example, if the halftone image 6a is constituted by cyan, magenta and yellow images, a color of dot rows 64 except for the misaligned dot row 64a becomes gray which is a mixed color of cyan, magenta and yellow. However, in the misaligned dot row 64a, a color of the non-overlapping portions 621 becomes blue which is a mixed color of cyan and magenta. Thus, bluish streak unevenness appears.

Figure 12:
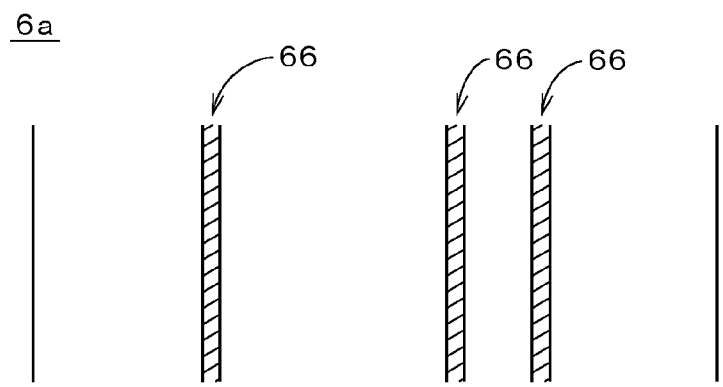
FIG. 12 is a view showing a halftone image.

In the halftone image 6a, since images of the color components are recorded so that a spatial frequency of the high intensity tint image is equal to a spatial frequency of the low intensity tint image in same gray level, numerous non-overlapping portions 621 are densely continuous in the misaligned dot row 64a. As a result, a line of the non-overlapping portions 621 is recognized as streak unevenness 66 (i.e., a part of streak unevenness) as shown by hatching in FIG. 12. In contrast to this, in the halftone image 6 shown in FIG. 10, since an image of each color component is recorded so that a spatial frequency of the high intensity tint image is lower than a spatial frequency of the low intensity tint image in same gray level, the non-overlapping portions 621 included in the misaligned dot row 65 are roughly arranged in the y direction, and streak unevenness in the halftone image 6 is prevented from becoming highly-visible.

The structure and operation in the image recording apparatus 1 and the halftone image recorded by the image recording apparatus 1 have been discussed above. In the image recording apparatus 1, with respect to the arrangement direction of the outlets, the pitch of the outlets 210b of the high intensity ink ejection part 211b is larger than the pitch of the outlets 210a of the low intensity ink ejection part 211a. Therefore, manufacturing cost of the image recording apparatus 1 can be reduced by reducing manufacturing cost of the high intensity ink ejection part 211b.

In the image recording apparatus 1, with respect to each gray level included in the middle grayscale range, if a halftone image is to be recorded, image recording is performed so that a spatial frequency of the high intensity tint image is lower than a spatial frequency of the low intensity tint image. Therefore, although the pitch of the outlets 210b is large, appearance of streak unevenness can be suppressed in the color halftone image.

Although the middle grayscale range in the above description does not have to be defined strictly, normally the middle grayscale range means a range from 20% to 80% in image density (equal to or more than 20% and equal to or less than 80%). The above relation of spatial frequencies between the low intensity tint image and the high intensity tint image is satisfied at least in the middle grayscale range predetermined as above. The technique of changing a spatial frequency of monochrome halftone image (single color halftone image) on the basis of intensity of ink is especially suitable for one pass printing where streak unevenness easily appears.

The above technique may be applied for a halftone image (multicolor halftone image) recorded with six colors of ink including light cyan and light magenta. In this case, in high intensity ink ejection parts for yellow ink, light cyan ink and light magenta ink each of which is high intensity ink, a pitch of outlets in the arrangement direction of the outlets is made larger than a pitch of outlets in the low intensity ink ejection parts. Therefore, manufacturing cost of the image recording apparatus 1 is significantly reduced, compared to the case where the outlets for each of all colors are densely arranged. In addition, if a tint image showing same gray level as a tint image with the low intensity ink is to be recorded with the high intensity ink, image recording is controlled so that a spatial frequency of the high intensity tint image is lower than a spatial frequency of the low intensity tint image in each gray level included in the middle grayscale range.

Therefore, in the halftone image with ink of six colors (multicolor halftone image) containing various gray values, appearance of streak unevenness can be suppressed. As above, when there are two or more kinds of ink which have same color phase and which show intensities different from each other, one kind of ink showing a highest intensity is treated as a high intensity ink. The color of ink treated as high intensity ink may be any one of colors of yellow, light cyan and light magenta. Spatial frequencies of high intensity tint images with yellow ink, light cyan ink and light magenta ink in same gray level may be equal to one another or different from one another.

Figure 13:
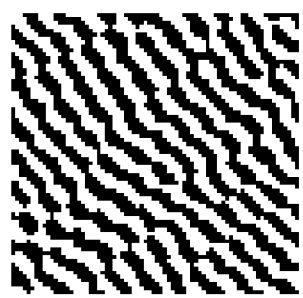
FIGS. 13 to 15 are views each showing another example of tint image.
Figure 14:
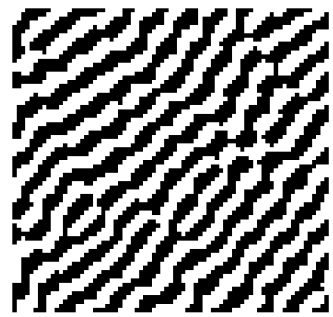
Figure 15:
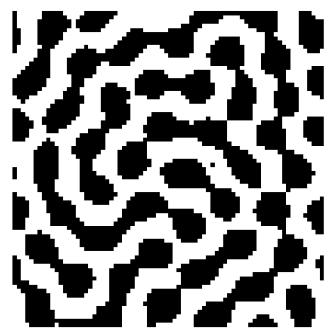

In the image recording apparatus 1, when a tint image is recorded with the high intensity ink, high intensity tint images 531, 532 each having anisotropy may be recorded as shown in FIGS. 13 and 14. In the case where a plurality of kinds of high intensity ink are used, by recording tint images whose directional properties are different from one another as shown in FIGS. 8D, 13 and 14, streak unevenness can be further suppressed. Also in this case, if tint images are printed in each gray level included in the middle grayscale range, image recording is controlled so that an average of spatial frequencies of the high intensity tint images is lower than an average of spatial frequencies of the low intensity tint images. In addition, as shown in FIG. 15, a high intensity tint image 533 whose spatial frequency is lower may be recorded. In the case where a plurality of kinds of high intensity ink are used, image recording may be controlled so that tint images whose spatial frequencies are different from each other in accordance with colors are recorded.

Though the preferred embodiments of the present invention have been discussed above, the present invention is not limited to the above-discussed preferred embodiments, but allows various variations.

In a halftone image recorded with the low intensity ink, as long as grayscale representation is made with a number density of unit dots arranged randomly and uniformly with respect to each gray level which is lower than at least a predetermined middle grayscale range of image density (i.e., each of gray levels included in the highlight side), grayscale representation may be performed by other various techniques with respect to gray levels included in the middle grayscale range and the shadow range. For example, with respect to the middle grayscale range and the shadow range, grayscale representation may be performed by causing dots disposed randomly and uniformly to grow in a similar fashion to a halftone image with the high intensity ink. In this case, at a transition value smaller than the above transition value where a manner of grayscale representation in a halftone image with the high intensity ink is changed (switched), a manner of grayscale representation in a halftone image with the low intensity ink is changed.

In the image recording apparatus 1, a color halftone image may be recorded with further use of gray ink. And the gray ink may be treated as the above high intensity ink.

In the above preferred embodiments, a halftone image may be formed with error diffusion method or the like, without using any threshold matrix.

In the image recording apparatus 1, there may be a case where unit dots of a plurality of sizes can be formed by ejecting droplets which have differing amounts of ink from the outlets 210a for ejecting the low intensity ink. Three or more sizes of unit dots may be formed with the low intensity ink or the high intensity ink. In the matrix memory 42, threshold matrices for each color corresponding to respective sizes of unit dots are stored (i.e., the number of threshold matrices for each color is equal to the number of the sizes.). Also in this case, when recording tint images in each gray level included in the middle grayscale range, control is performed so that a spatial frequency of the high intensity tint image becomes lower than a spatial frequency of the low intensity tint image. Therefore, it is achieved to suppress streak unevenness in a normal halftone image which is not limited to tint images.

In the image recording apparatus 1, a halftone image may be recorded on the printing paper 9 by a plurality of times of relative movement of the head 21 to the printing paper 9. In the state where the printing paper 9 is fixed, the head 21 may move in the moving direction to perform image recording.

In the low intensity ink ejection part 211a, the plurality of outlets 210a may be arranged in a staggering manner. A plurality of rows of the outlets 210a may be arranged in the moving direction. The same applies to the high intensity ink ejection part 211b.

The image recording apparatus 1 may record an image on other objects such as a plastic film other than the printing paper 9. In the case where an image is recorded on a plastic film or the like, for example, UV (ultraviolet) curable ink is used as ink ejected from the ejection part 211, and irradiation parts for irradiating UV light to ink on the object are provided as substitute for the heaters 213.

The constituent elements of above-discussed preferred embodiments and modified examples may be appropriately combined with one another, as long as they are not mutually exclusive.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2011-27333 filed in the Japan Patent Office on Feb. 10, 2011, the entire disclosure of which is incorporated herein by reference.

REFERENCE SIGNS LIST 1 image recording apparatus
4 operation part
6, 6a halftone image
9 printing paper
22 moving mechanism
42 matrix memory
43 comparator
61 high intensity unit dot
62 low intensity unit dot
101 ejection controller 210a, 210b outlet
211a low intensity ink ejection part
211b high intensity ink ejection part
511 to 516 low intensity tint image
521 to 526, 531 to 533 high intensity tint image
710 threshold matrix
P1, P2 pitch

The invention claimed is:

1. An image recording apparatus using an inkjet mechanism, for recording a halftone image on an object, comprising:
   a first ejection part having a plurality of first outlets for ejecting droplets of low intensity ink toward an object;
   a second ejection part having a plurality of second outlets for ejecting droplets of high intensity ink toward said object;
   a moving mechanism for moving said object relative to said first ejection part and said second ejection part; and
   a controller for controlling ejection of ink from said first ejection part and said second ejection part in synchronization with relative movement of said object; wherein
   with respect to a direction which is orthogonal to a moving direction of said object by said moving mechanism and which is parallel with a recording surface of said object, a pitch of said plurality of second outlets is larger than a pitch of said plurality of first outlets,
   under control of said controller, with respect to each gray level included in a predetermined middle grayscale range of image density, if a tint image is recorded with said high intensity ink, a spatial frequency of said tint image is lower than a spatial frequency of a tint image recorded with said low intensity ink, and with respect to each gray level which is lower than at least said middle grayscale range, dots each of which is a minimum unit of dot formation with said low intensity ink are randomly disposed on said object while being away from one another and grayscale representation is made with a number density of said dots.

2. The image recording apparatus according to claim 1, wherein
   said high intensity ink is yellow ink.

3. The image recording apparatus according to claim 1, wherein
   said high intensity ink is light cyan ink or light magenta ink.

4. The image recording apparatus according to claim 1, wherein
   said controller comprises:
   a memory which stores threshold matrices each of which is a two dimensional array of a plurality of threshold values; and
   a halftone image generator for generating data of a halftone image to be recorded, by comparing original image data with said threshold matrices.

5. The image recording apparatus according to claim 4, wherein
   under control of said controller, with respect to each gray level included in a range from zero to a transition value lower than said middle grayscale range, dots each of which is a minimum unit of dot formation with said high intensity ink are randomly disposed on said object while being away from one another and grayscale representation is made with a number density of said dots, and with respect to gray levels which are higher than said transition value, a number density of centers of dots with said high intensity ink is constant and grayscale representation is made with sizes of said dots.

6. The image recording apparatus according to claim 1, wherein
   a halftone image is recorded on said object by one movement of said first ejection part and said second ejection part relative to said object by said moving mechanism.

7. The image recording apparatus according to claim 2, wherein
   a halftone image is recorded on said object by one movement of said first ejection part and said second ejection part relative to said object by said moving mechanism.

8. The image recording apparatus according to claim 3, wherein
   a halftone image is recorded on said object by one movement of said first ejection part and said second ejection part relative to said object by said moving mechanism.

9. The image recording apparatus according to claim 4, wherein
   a halftone image is recorded on said object by one movement of said first ejection part and said second ejection part relative to said object by said moving mechanism.

10. The image recording apparatus according to claim 5, wherein
    a halftone image is recorded on said object by one movement of said first ejection part and said second ejection part relative to said object by said moving mechanism.

11. An image recording method using an inkjet mechanism, of recording a halftone image on an object, comprising the steps of:
    a) moving an object relative to a first ejection part and a second ejection part;
    b) ejecting droplets of low intensity ink toward said object from a plurality of first outlets of said first ejection part in parallel with said step a); and
    c) ejecting droplets of high intensity ink toward said object from a plurality of second outlets of said second ejection part in parallel with said step a); wherein
    with respect to a direction which is orthogonal to a moving direction of said object and which is parallel with a recording surface of said object, a pitch of said plurality of second outlets is larger than a pitch of said plurality of first outlets,
    under ejection control of droplets of ink in said steps b) and c), with respect to each gray level included in a predetermined middle grayscale range of image density, if a tint image is recorded with said high intensity ink, a spatial frequency of said tint image is lower than a spatial frequency of a tint image recorded with said low intensity ink, and with respect to each gray level which is lower than at least said middle grayscale range, dots each of which is a minimum unit of dot formation with said low intensity ink are randomly disposed on said object while being away from one another and grayscale representation is made with a number density of said dots.

12. The image recording method according to claim 11, wherein
    said high intensity ink is yellow ink.

13. The image recording method according to claim 11, wherein
    said high intensity ink is light cyan ink or light magenta ink.

14. The image recording method according to claim 11, wherein
    under said ejection control, with respect to each gray level included in a range from zero to a transition value lower than said middle grayscale range, dots each of which is a minimum unit of dot formation with said high intensity ink are randomly disposed on said object while being away from one another and grayscale representation is made with a number density of said dots, and with respect to gray levels which are higher than said transition value, a number density of centers of dots with said high intensity ink is constant and grayscale representation is made with sizes of said dots.

15. The image recording method according to claim 11, wherein a halftone image is recorded on said object by one movement of said first ejection part and said second ejection part relative to said object.

16. The image recording method according to claim 12, wherein a halftone image is recorded on said object by one movement of said first ejection part and said second ejection part relative to said object.

17. The image recording method according to claim 13, wherein a halftone image is recorded on said object by one movement of said first ejection part and said second ejection part relative to said object.

18. The image recording method according to claim 14, wherein a halftone image is recorded on said object by one movement of said first ejection part and said second ejection part relative to said object.

* * * * *